US009277385B2

(12) United States Patent
Iwamoto

(10) Patent No.: US 9,277,385 B2
(45) Date of Patent: Mar. 1, 2016

(54) 911 ASSIST BY WIRELESS CHARGER WITH NFC IN THE VEHICLE

(71) Applicant: DENSO International America, Inc., Southfield, MI (US)

(72) Inventor: Reiji Iwamoto, West Bloomfield, MI (US)

(73) Assignees: Denso International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 22 days.

(21) Appl. No.: 14/208,937

(22) Filed: Mar. 13, 2014

(65) Prior Publication Data
US 2015/0264545 A1    Sep. 17, 2015

(51) Int. Cl.
*H04W 4/22* (2009.01)
(52) U.S. Cl.
CPC ....................... *H04W 4/22* (2013.01)
(58) Field of Classification Search
CPC ..... H04W 4/008; H04W 4/22; H04W 76/023; H04W 8/005; H04W 76/007; H04W 4/06; H04W 76/02; H04W 4/005; H04B 5/0031; H04B 5/0037; H04B 5/0075; H04B 5/00; H04B 5/0025; H04B 5/0087; H04M 2250/04; H04M 11/04; H04M 1/7253; H04M 2242/04
USPC ............................. 455/404.1, 41.1, 41.2, 41.3
See application file for complete search history.

(56) References Cited

U.S. PATENT DOCUMENTS

| 2002/0095253 | A1* | 7/2002 | Losey et al. ..................... 701/71 |
| 2009/0075703 | A1* | 3/2009 | Furbeck ..................... 455/569.2 |
| 2009/0233572 | A1* | 9/2009 | Basir ........................ 455/404.1 |
| 2009/0261958 | A1* | 10/2009 | Sundararajan et al. ....... 340/436 |
| 2010/0130160 | A1* | 5/2010 | Fayyad ..................... 455/404.1 |
| 2011/0098016 | A1* | 4/2011 | Hatton ................. G08B 25/016 455/404.2 |
| 2012/0252364 | A1* | 10/2012 | Inabathuni et al. .......... 455/41.2 |
| 2013/0069802 | A1* | 3/2013 | Foghel et al. ................. 340/989 |
| 2013/0110318 | A1* | 5/2013 | Colja et al. ........................ 701/2 |
| 2013/0130639 | A1* | 5/2013 | Oesterling et al. ......... 455/404.1 |
| 2013/0154819 | A1  | 6/2013 | Stefanovski et al. |
| 2013/0273877 | A1* | 10/2013 | Kote ...................... H04W 4/22 455/404.2 |
| 2014/0217816 | A1* | 8/2014 | Okada .......................... 307/10.1 |
| 2014/0357215 | A1* | 12/2014 | Michaelis ............. H04W 4/027 455/404.2 |

* cited by examiner

*Primary Examiner* — Magdi Elhag
(74) *Attorney, Agent, or Firm* — Harness, Dickey & Pierce, P.L.C.

(57) ABSTRACT

A method for requesting emergency assistance for a vehicle involved in an accident. The method includes the following: storing vehicle operating conditions prior to the accident in a storage device; detecting the accident; after the accident, deactivating charging of a smartphone being charged on a wireless charging pad; transmitting to the smartphone the vehicle operating conditions stored prior to the accident; transmitting the vehicle operating conditions from the smartphone to emergency authorities; and calling the emergency authorities using the smartphone and initiating handsfree communication with the emergency authorities.

15 Claims, 3 Drawing Sheets

911 ASSIST BY WIRELESS CHARGER WITH NFC IN THE VEHICLE

FIELD

The present disclosure relates to methods, systems, and devices for requesting emergency assistance for a vehicle involved in an accident.

BACKGROUND

This section provides background information related to the present disclosure, which is not necessarily prior art.

Motor vehicles are being increasingly outfitted with emergency assistance systems, which are capable of requesting emergency assistance upon detection of an accident. While current emergency assistance systems are suitable for their intended use, they are subject to improvement. The present teachings address various needs in the art by providing methods, systems, and devices for requesting emergency assistance for a vehicle involved in an accident, which eliminate transmission interference that may be caused by a wireless charger.

SUMMARY

This section provides a general summary of the disclosure, and is not a comprehensive disclosure of its full scope or all of its features.

The present teachings provide for a method for requesting emergency assistance for a vehicle involved in an accident. The method includes the following: storing vehicle operating conditions prior to the accident in a storage device; detecting the accident; after the accident, deactivating charging of a smartphone being charged on a wireless charging pad; transmitting to the smartphone the vehicle operating conditions stored prior to the accident; transmitting the vehicle operating conditions from the smartphone to emergency authorities; and calling the emergency authorities using the smartphone and initiating handsfree communication with the emergency authorities.

The present teachings further provide for a system for requesting emergency assistance for a vehicle involved in an accident. The system includes a controller, a storage device, a wireless charging pad, and a transmitter. The controller is configured to control at least a portion of the system. The storage device is configured to store vehicle operating conditions present prior to the accident. The wireless charging pad is configured to wirelessly charge a smartphone placed thereon, and the controller is configured to cease charging by the charging pad after detection of the accident. The transmitter is configured to transmit to the smartphone the vehicle operating conditions stored prior to the accident. The controller is configured to command the smartphone to transmit the vehicle operating conditions to emergency authorities after the accident, command the smartphone to call the emergency authorities, and initiate hands free communication with the emergency authorities.

The present teachings also provide for a device for requesting emergency assistance for a vehicle involved in an accident. The device includes a controller, a storage device, a wireless charging pad, a transmitter, and a housing. The storage device is configured to store vehicle operating conditions present prior to the accident. The wireless charging pad is configured to wirelessly charge a smartphone placed thereon. The controller is configured to cease charging by the wireless charging pad after detection of the accident. The transmitter is configured to transmit to the smartphone vehicle operating conditions stored prior to the accident. The housing includes the controller, the storage device, the wireless charging pad, and the transmitter.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
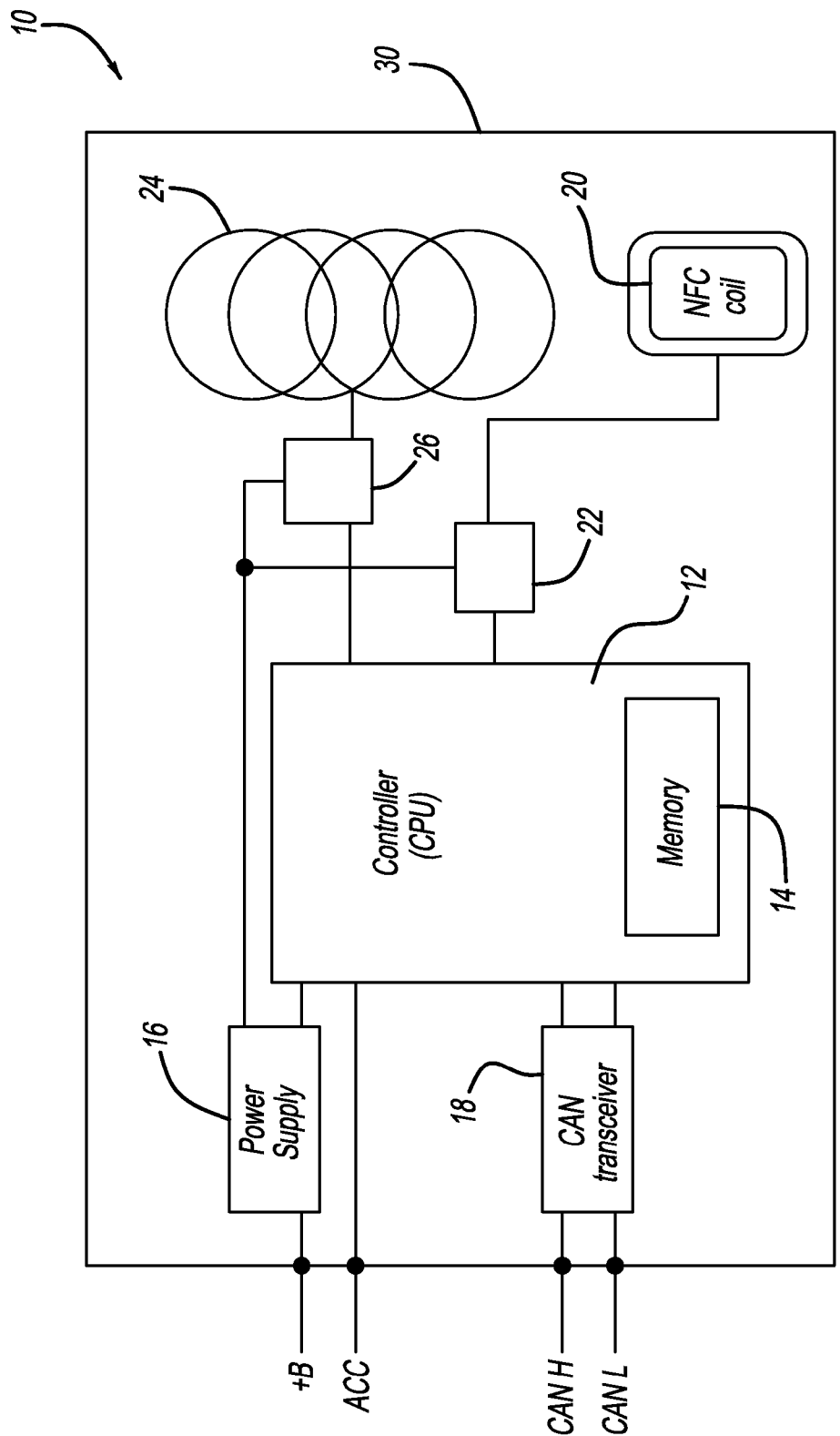
FIG. 1 is a schematic view of a system and device according to the present teachings for requesting emergency assistant for a vehicle involved in an accident.

With initial reference to FIG. 1, an exemplary system according to the present teachings for requesting emergency assistance for a vehicle involved in an accident is generally illustrated at reference numeral 10. The system 10 generally includes a controller 12, which may include a memory 14. The controller 12 may be any controller suitable for operating the system 10, such as a central processing unit (CPU), or any other suitable control device. The memory 14 can be included with the controller 12, or in communication therewith in any suitable manner. The memory 14 can be any suitable memory for storing vehicle operating conditions as described herein.

The controller 12 is powered by a power supply 16, which may be any suitable power supply, such as a battery. The controller 12 receives various inputs, such as inputs from vehicle accessories, as well as controller area network (CAN) bus inputs from a CAN transceiver 18. The inputs from the CAN transceiver 18 include information regarding various vehicle operating conditions, such as the following: vehicle position, such as GPS position; airbag status; roll over status; and time data, such as the time at which the other vehicle operating conditions were measured or determined. The vehicle operating conditions are stored in the memory 14.

The vehicle operating conditions can be stored in the memory 14 in any suitable manner, such as in a plurality of data packets. Each one of the plurality of data packets include vehicle operating conditions determined or measured at a particular time, such as at predetermined time intervals. At the direction of the controller 12, a plurality of the most recently assembled data packets may be stored in the memory 14. Each one of the stored data packets will include vehicle operating conditions determined or measured at a different time, such as the following vehicle operating conditions: vehicle position; airbag status; roll over status; and time. The time intervals at which the data packets are assembled and stored can be any suitable time interval. Any suitable number of data packets may be stored in the memory 14, such as the five most recently assembled data packets. As a new data packet is assembled, the oldest stored data packet can be deleted.

Figure 2:
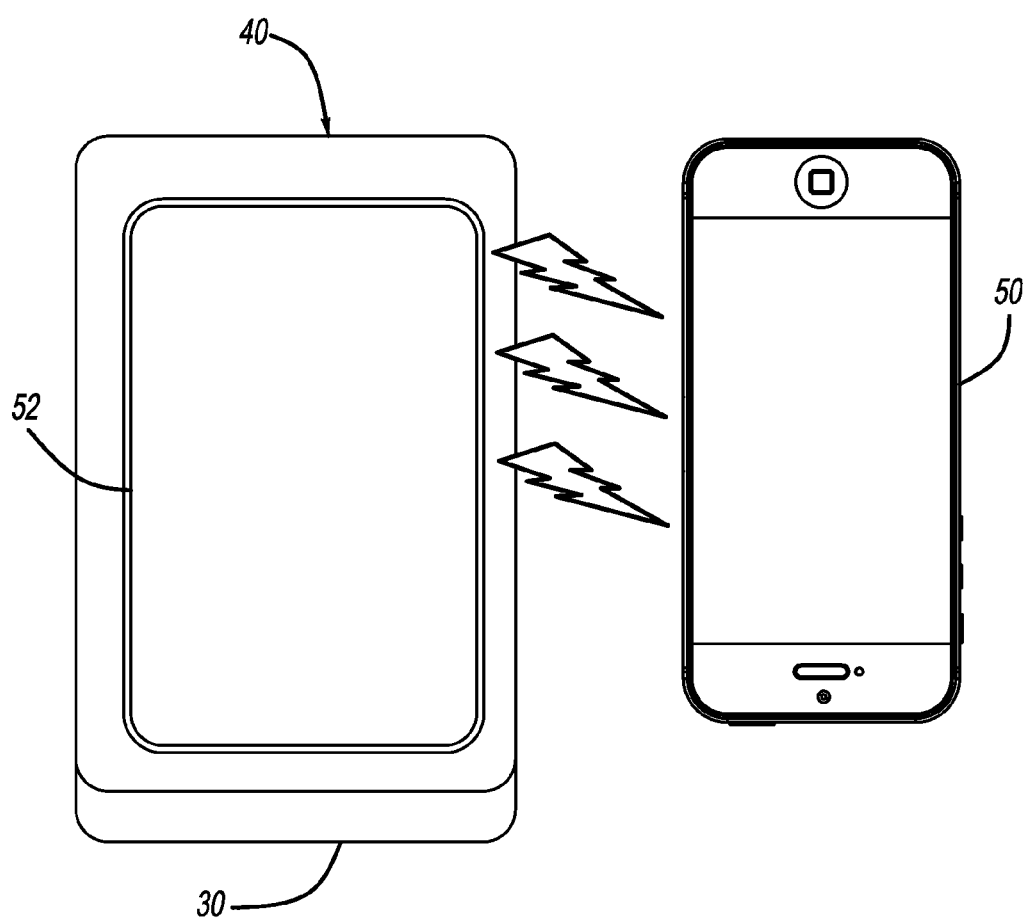
FIG. 2 illustrates a device according to the present teachings for requesting emergency assistance for a vehicle involved in an accident, as well as a smart phone.
Figure 3:
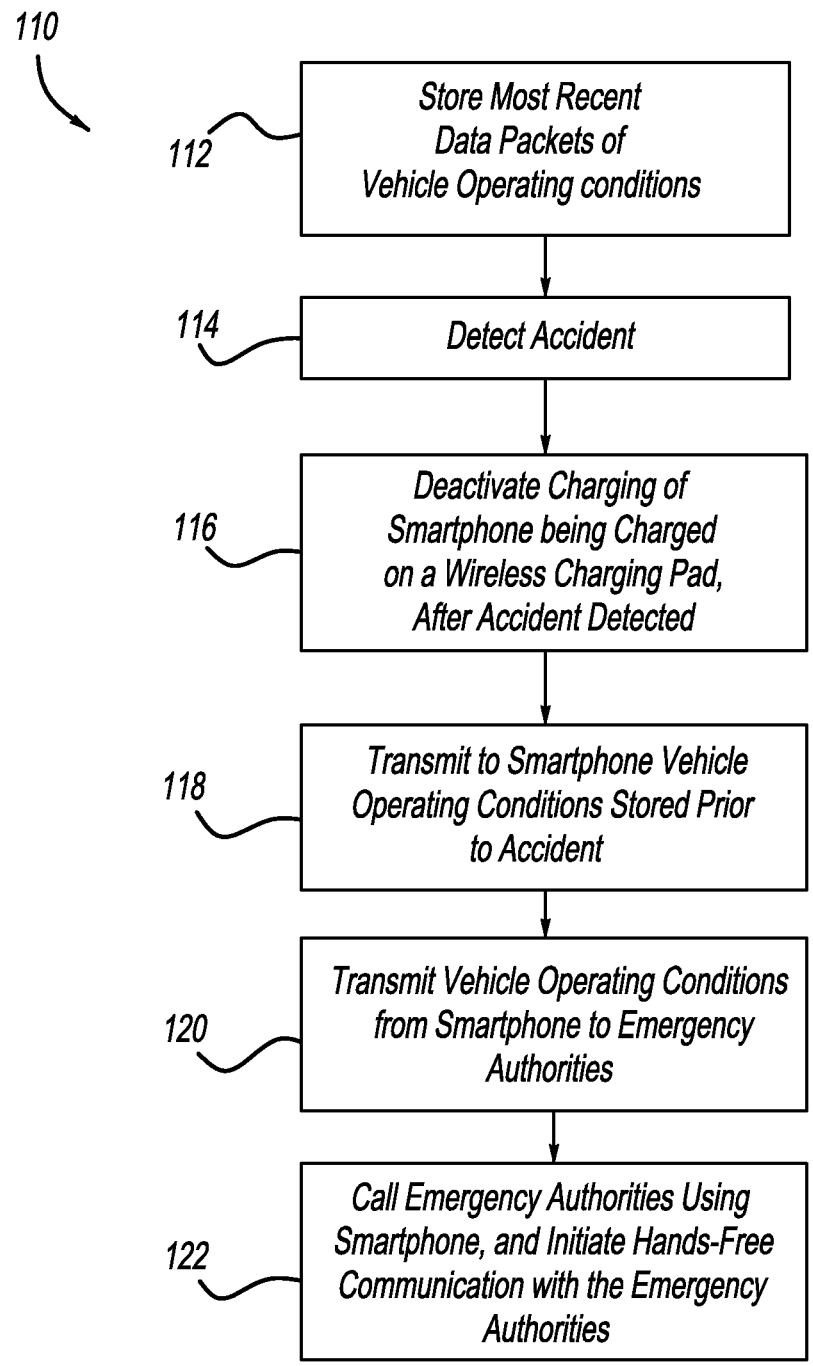
FIG. 3 illustrates a method according to the present teachings for requesting emergency assistance for a vehicle involved in an accident.

The system 10 further includes a transmitter 20. The transmitter 20 can be any suitable transmitter such as a near field communication (NFC) coil. The transmitter 20 is suitable for transmitting information, such as the data packets, to a suitable handheld device, such as a smart phone 50 (FIG. 2). The transmitter 20 is driven by a driver 22, which may be any suitable device for driving the transmitter 20. The driver 22 is typically between the transmitter 20 and the controller 12, and the controller 12 is in communication with the transmitter 20 to permit transmission of the data packets by the transmitter 20.

The system 10 further includes a wireless charger coil 24 driven by a driver 26. The wireless charger coil 24 can be any suitable coil or device for wirelessly charging the smartphone 50. The driver 26 is controlled by the controller 12, which may deactivate the wireless charger coil 24 in the event of an accident, as explained further herein.

The controller 12, memory 14, power supply 16, CAN transceiver 18, transmitter 20, wireless charger coil 24, and drivers 22 and 26 may be provided together within any suitable housing 30. Any suitable housing can be used, such as the housing 30 of FIG. 2, which generally provides a device 40 according to the present teachings for requesting emergency assistance for a vehicle involved in an accident. The device 40 can be a retrofit device suitable for being installed in any vehicle to provide the vehicle with enhanced emergency assistance capabilities. The device 40 can also be configured for installation in a new vehicle as well.

A method for requesting emergency assistance for a vehicle involved in an accident according to the present teachings is generally illustrated at reference numeral 110. The method 110 can be performed by the system 10 and/or device 40 described above, or any other suitable system or device. The method 110 is described herein with respect to the system 10 and the device 40 for exemplary purposes only.

With initial reference to block 112, the controller 12 stores the most recent data packets, such as the five most recent data packets of vehicle operating conditions. As explained above, the vehicle operating conditions can be any one or more of the following: vehicle position, airbag status, roll over status, and time. As more recent data packets are stored, the older data packets may be deleted from the memory 14.

Based on the vehicle operating conditions, the controller 12 is configured to detect an accident. For example, if the airbag status indicates that the airbag has been deployed, or the roll over status indicates that the vehicle has rolled over, the controller 12 will interpret these conditions as associated with an accident, and detect an accident condition at block 114. At block 116, the controller 12 will deactivate charging of any smart phone 50 being charged by the wireless charger coil 24 on a wireless charging pad 52 after an accident is detected at block 114. By deactivating the wireless charger coil 24, any possibility of interference between the wireless charger coil 24 and transmitter 20 will be eliminated.

At block 118, the controller 12 transmits the most recent data packet of vehicle operating conditions to the smart phone 50 by way of the transmitter 20. If the controller 12 determines that the most recently stored data packet is incomplete, the controller 12 will not transmit the most recent data packet. Instead, the controller 12 will transmit the next most recently stored data packet with complete data regarding vehicle operating conditions prior to the accident.

At block 120, the controller 12 will command the smart phone 50, by way of a signal transmitted using transmitter 20, to transmit the data packet including the most recent and complete vehicle operating conditions to emergency authorities. Thus emergency authorities will have access to the position of the vehicle, the airbag status, the roll over status, and the time at which this information was gathered and/or measured. The emergency authorities will then be able to dispatch emergency assistance as appropriate.

At block 122, the controller 12 will transmit a command to the smart phone 50 by way of the transmitter 20 commanding the smart phone 50 to telephone emergency authorities, so as to allow the passenger(s) to communicate with the emergency authorities. The controller 12 can activate hands free communication by commanding the smart phone 50 to activate its speaker phone, or by activating a hands free telephone system of the vehicle in communication with the smart phone 50 in any suitable manner.

The present teachings thus eliminate any possibility of interference between the wireless charger coil 24 and the transmitter 20 by deactivating the wireless charger coil 24 after detection of an accident, thereby allowing unobstructed transmission of vehicle operating conditions to the smart phone 50 for ultimate transmission to emergency authorities without any possibility of interference from the wireless charger coil 24.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for requesting emergency assistance for a vehicle involved in an accident, the method comprising:
   storing vehicle operating conditions in a plurality of data packets prior to the accident in a storage device;
   detecting the accident;
   after the accident, deactivating charging of a smartphone being charged on a wireless charging pad;
   transmitting to the smartphone the vehicle operating conditions stored prior to the accident;
   transmitting the vehicle operating conditions from the smartphone to emergency authorities;
   calling the emergency authorities using the smartphone and initiating hands free communication with the emergency authorities;
   transmitting to the emergency authorities a most recently stored data packet; and
   transmitting to the emergency authorities a next most recently stored data packet with complete vehicle operating conditions if the most recently stored data packet is incomplete.

2. The method of claim 1, further comprising storing one or more of the following as the vehicle operating conditions: vehicle position, airbag status, roll-over status, and time.

3. The method of claim 1, wherein each one of the plurality of data packets include the following: vehicle position, airbag status, roll over status, and time.

4. The method of claim 3, further comprising storing the vehicle operating conditions of each one of the plurality of data packets at different times based on a predetermined time interval.

5. The method of claim 4, further comprising storing the data packets of most recent time intervals.

6. The method of claim 4, further comprising storing the data packets of five most recent time intervals.

7. The method of claim 1, further comprising transmitting to the smart phone the vehicle operating conditions using near field communication (NFC).

8. A system for requesting emergency assistance for a vehicle involved in an accident, the system comprising:
   a controller configured to control at least a portion of the system;
   a storage device configured to store vehicle operating conditions in a plurality of data packets present prior to the accident;
   a wireless charging pad configured to wirelessly charge a smartphone placed thereon, the controller configured to cease charging by the charging pad after detection of the accident; and
   a transmitter configured to transmit to the smartphone the vehicle operating conditions stored prior to the accident; wherein
   the controller is configured to:
   command the smartphone to transmit the vehicle operating conditions to emergency authorities after the accident;
   command the smartphone to call the emergency authorities;
   initiate hands free communication with the emergency authorities;
   command the smartphone to transmit to emergency authorities a most recently stored data packet; and
   command the smartphone to transmit to emergency authorities a next most recently stored data packet with complete data when the most recently stored data packet is incomplete.

9. The system of claim 8, each one of the plurality of data packets include the following: vehicle position, airbag status, roll over status, and time.

10. The system of claim 9, wherein the vehicle operating conditions of each one of the plurality of data packets are stored at different times based on a predetermined time interval, and only data packets of most recent time intervals are stored.

11. The system of claim 8, wherein the wireless charging pad includes a wireless charging coil and a near field communication (NFC) coil of the transmitter.

12. A device for requesting emergency assistance for a vehicle involved in an accident, the device comprising:
    a controller;
    a storage device configured to store vehicle operating conditions in a plurality of data packets present prior to the accident;
    a wireless charging pad configured to wirelessly charge a smartphone placed thereon, the controller configured to cease charging by the wireless charging pad after detection of the accident;
    a transmitter configured to transmit to the smartphone vehicle operating conditions stored prior to the accident; and
    a housing including the controller, the storage device, the wireless charging pad, and the transmitter; wherein the controller is configured to command the smartphone to transmit to emergency authorities a most recently stored data packet; and the controller is configured to command the smartphone to transmit to the emergency authorities a next most recently stored data packet with complete data when the most recently stored data packet is incomplete.

13. The device of claim 12, wherein the device is configured to be installed in the vehicle to retrofit the vehicle.

14. The device of claim 12, wherein the transmitter is a near field communication (NFC) transmitter.

15. The device of claim 12, wherein:

each one of the data packets including the following: vehicle position, airbag status, roll over status, and time; and the controller is configured to store the vehicle operating conditions of each one of the plurality of data packets at different times based on a predetermined time interval.

* * * * *